United States Patent [19]
Dodgen

[11] Patent Number: 5,129,385
[45] Date of Patent: Jul. 14, 1992

[54] BARBECUE OVEN

[75] Inventor: John N. Dodgen, Humboldt, Iowa

[73] Assignee: Dodgen Industries, Inc., Humboldt, Iowa

[21] Appl. No.: 757,971

[22] Filed: Sep. 12, 1991

[51] Int. Cl.⁵ .............................................. F24B 3/00
[52] U.S. Cl. ................................... 126/25 R; 99/446
[58] Field of Search ............ 126/25 R, 25 AA, 41 R; 99/446

[56] References Cited

U.S. PATENT DOCUMENTS

| 4,700,618 | 10/1987 | Cox | 126/25 R |
|---|---|---|---|
| 4,773,319 | 9/1988 | Holland | 99/446 |
| 4,909,137 | 3/1990 | Brugnoli | 99/446 |

Primary Examiner—Carroll B. Dority
Attorney, Agent, or Firm—Zarley, McKee, Thomte, Voorhees, & Seas

[57] ABSTRACT

A barbecue oven has a cooking compartment having a top and a bottom. A combustion chamber is mounted on the oven below the cooking compartment. An inclined floor is in the oven below the cooking compartment and above the combustion compartment, and is tilted towards a grease collection receptacle. At least one tube connects the bottom of the grease collection receptacle with the combustion compartment so that as the receptacle fills with grease, the level of grease will rise in the tube and gradually overflow into the combustion chamber, for combustion therein.

5 Claims, 2 Drawing Sheets

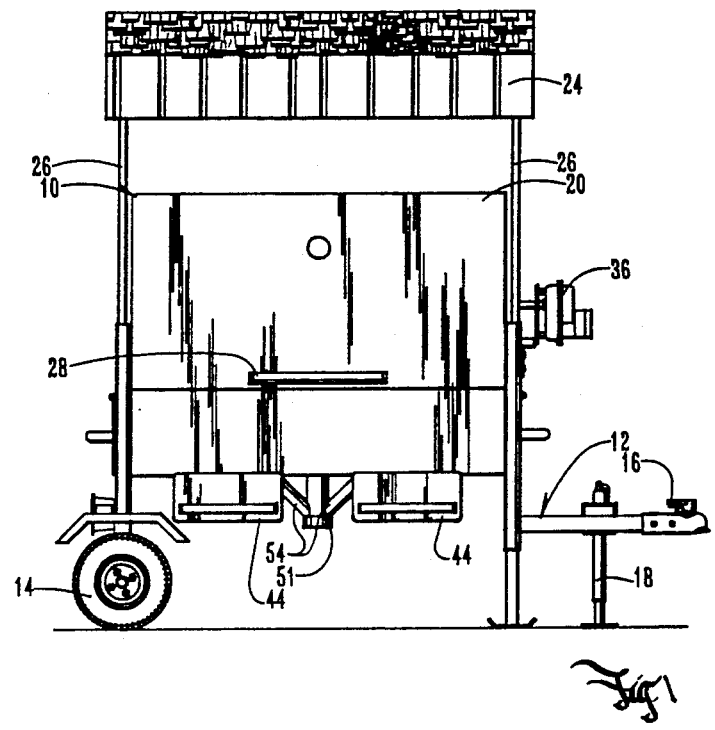
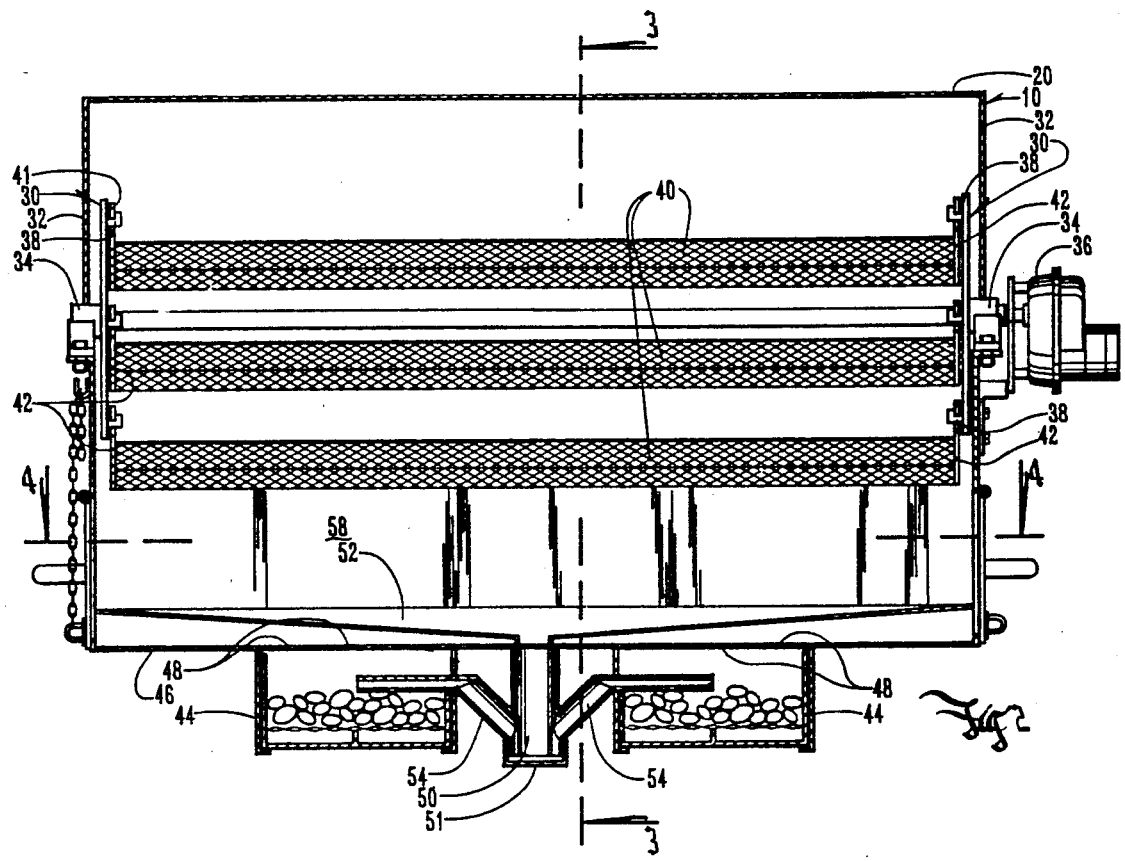

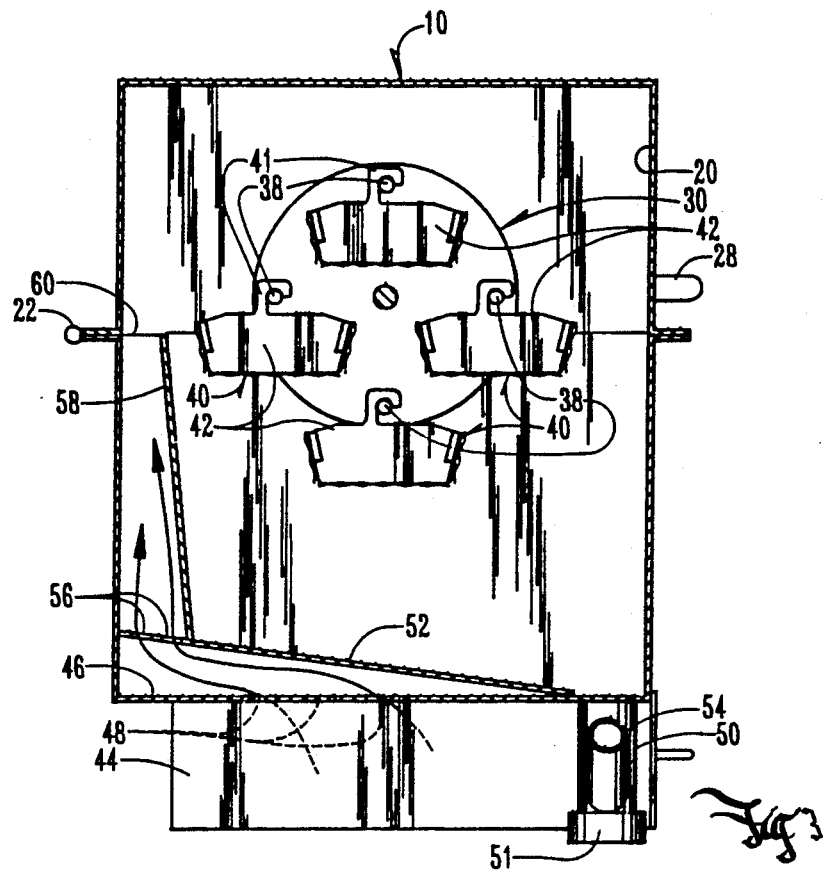
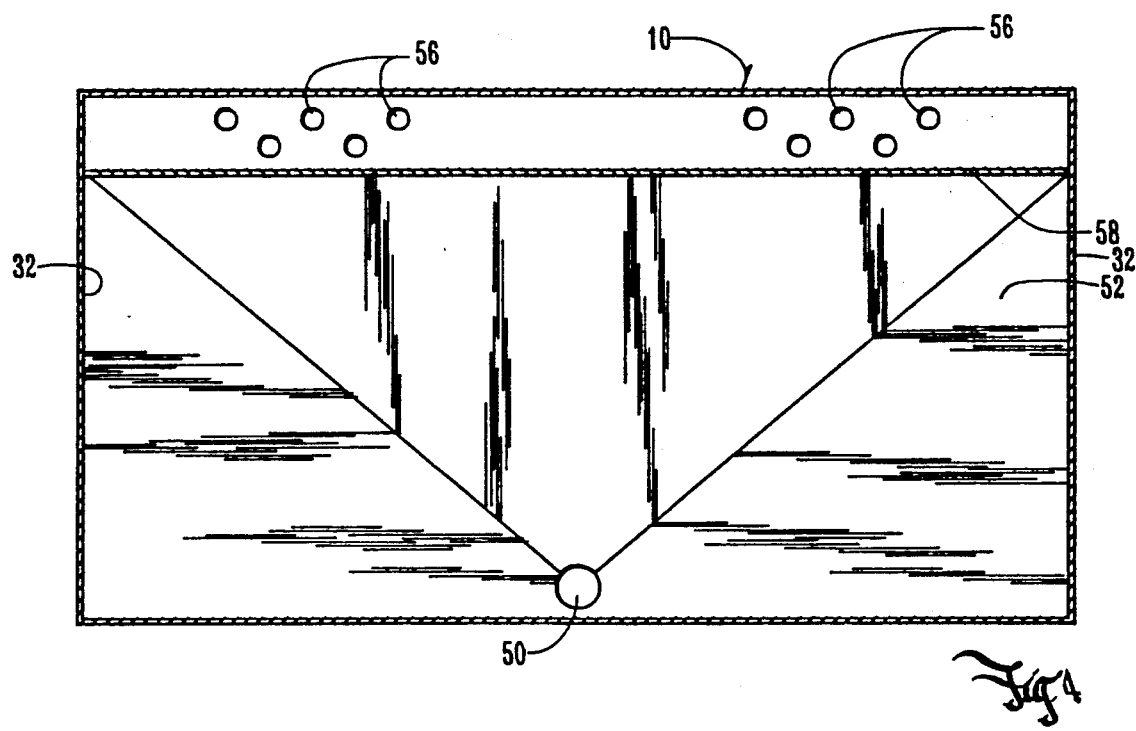

BARBECUE OVEN

BACKGROUND OF THE INVENTION

The flare-up fire from burning grease dripping from cooked meat into the combustion chamber is a common and troublesome problem with most existing barbecue ovens. The increased smoke and fire from such occasions can have a detrimental affect on the meat being cooked.

Existing ovens have grease receptacles that collect excess grease that does not burn, but the grease tends to contribute to the lack of cleanliness of the oven, and disposal of collected grease is often an inconvenient and unpleasant task.

It is therefore principal object of this invention to provide a barbecue oven that will prevent grease drippings from food being cooked to fall indiscriminately into the combustion chamber for possible ignition and flare-up.

A further object of this invention is to provide a grease recycling system for barbecue ovens whereby grease drippings are collected and gradually moved to a protected combustion chamber on the oven for disposal by combustion in the combustion chamber.

A still further object of this invention is to provide a means for recycling grease drippings in barbecue ovens whereby the drippings can be combusted under control to enhance the flavor of the food being cooked from the smoke of combustion.

These and other objects will be apparent to those skilled in the art.

SUMMARY OF THE INVENTION

The barbecue oven of this invention has a cooking compartment having a top and a bottom. A combustion chamber is mounted on the oven below the cooking compartment. An inclined floor means is in the oven below the cooking compartment and above the combustion compartment, and is tilted towards a grease collection receptacle. At least on e tube connects the bottom of the grease collection receptacle with the combustion compartment so that as the receptacle fills with grease, the level of grease will rise in the tube and gradually overflow into the combustion chamber, for combustion therein.

BRIEF DESCRIPTION OF THE DRAWINGS

FIG. 1 is a side elevational view of the cooking oven of this invention;

FIG. 2 is an enlarged scale sectional view of the cooking and combustion chambers of FIG. 1;

FIG. 3 is a transverse sectional view taken on line 3—3 of FIG. 2; and

FIG. 4 is a horizontal sectional view taken on line 4—4 of FIG. 2.

DESCRIPTION OF THE PREFERRED EMBODIMENT

The numeral 10 designates a cooking oven mounted on trailer frame 12 which has a pair of wheels 14 at one end, and a tongue 16 at the other end supported by retractable jack 18. A lid 20 covers the top of the oven and is connected thereto by hinges 22. A roof shelter 24 extends over oven 10 and is supported on posts 26 secured by any convenient means to the ends of the oven. Handle 28 is secured to the front of lid 20 to facilitate opening and closing the same.

A circular plate 30 is rotatably mounted on the inner face of each of the ends 32 of oven 10 by means of bushings 34. An electric motor 36 with suitable controls (not shown) is connected to one end 32 of oven 10 and connected by any convenient means through the bushing 34 to the adjacent plate 30. Each plate 30 has four horizontal arms 38. Elongated trays 40 extend between corresponding arms 38 on each plate 30, and are rotatably secured to the outer ends of the arms 38. The trays 40 are offset from the ends of the arms 38 by hooks 41 on tray ends 42 which causes the trays 40 to always hang from the arms 38 in transverse horizontal position.

Two combustion material boxes 44 are secured to the bottom 46 of oven 10. Bottom 46 is perforated at 48 above the trays 46. A grease cylinder 50 extends downwardly from bottom 46 inbetween boxes 44, and a removable cap 51 is secured to the bottom end thereof. Tubes 54 extend upwardly and thence horizontally from the bottom of cylinder 50 to the upper portion of boxes 44.

A grease floor 52 extends downwardly from the rear wall 54 of oven 10, and from ends 32, to terminate at the top of grease cylinder 50 which can be designated as a grease collection area. The back portion of floor 52 is perforated at 56. An elongated flue 58 or chimney is mounted over perforations 56, and its open upper end 60 terminates near the level of any tray 40 that is in the "3 o'clock" position of the tray 40 shown in FIG. 3.

Grease falling from cooking food on trays 40 falls to floor 52, and flows by gravity to the top of cylinder 50. If it is desired to dispose of the grease, cap 51 is removed from cylinder 50, and a disposal receptacle is placed below cylinder 50. If it is desired to recycle the grease drippings, the cap 51 is left in place. As the grease drippings accumulate and fill cylinder 50, tubes 54 are also filled with grease. When the cylinder 50 is almost filled with grease, the grease in tube 54 overflows and trickles into combustion boxes 44 where it is gradually burned by ignited charcoal or the like in boxes 44. Grease in tubes 54 will not ignite because there is no air to support combustion in the tubes. Heat and a controlled amount of smoke from the ignition of this grease pass upwardly through perforations 48 and 56 into flue 58 where they are exhausted from the flue in close proximity to the rotating trays 40.

No flame flare-up will likely result from ignited grease. The smoke of combusted grease will enhance the food on trays 44 and the grease drippings will be disposed of without further activity. Thus, it is seen that this invention will achieve at least all of its stated objectives.

I claim:

1. A barbecue oven, comprising:
   a cooking compartment having a top and a bottom,
   a combustion compartment mounted to said oven adjacent the bottom of said cooking compartment,
   an inclined floor means in the bottom of said cooking compartment and above said combustion compartment and tilted towards a grease collection area,
   a grease receptacle located at said grease collection area,
   and means connecting said grease receptacle with said combustion chamber so that grease will move by gravity into said combustion compartment.

2. The oven of claim 1 wherein said grease receptacle has a top and a bottom with said top comprising said grease collection area, and said connecting means is comprised of tube means extending upwardly from the bottom of said grease receptacle towards said combustion chamber, and terminating at a level below the top of said grease receptacle.

3. The oven of claim 2 wherein said tube means is sloped to an extent that it will be substantially filled with grease before permitting grease to move therefrom to said combustion chamber to prevent air to have access to grease in said tube means, thereby preventing ignition thereof by combustible material in said combustion chamber.

4. The oven of claim 1 wherein said grease receptacle has a closable drain means.

5. The oven of claim 3 wherein said tube means has an upper end positioned at a level below said grease collection area.

* * * * *